March 7, 1967 V. J. GRANDE 3,308,402
CAVITY RESONATOR APPARATUS
Filed Dec. 30, 1964
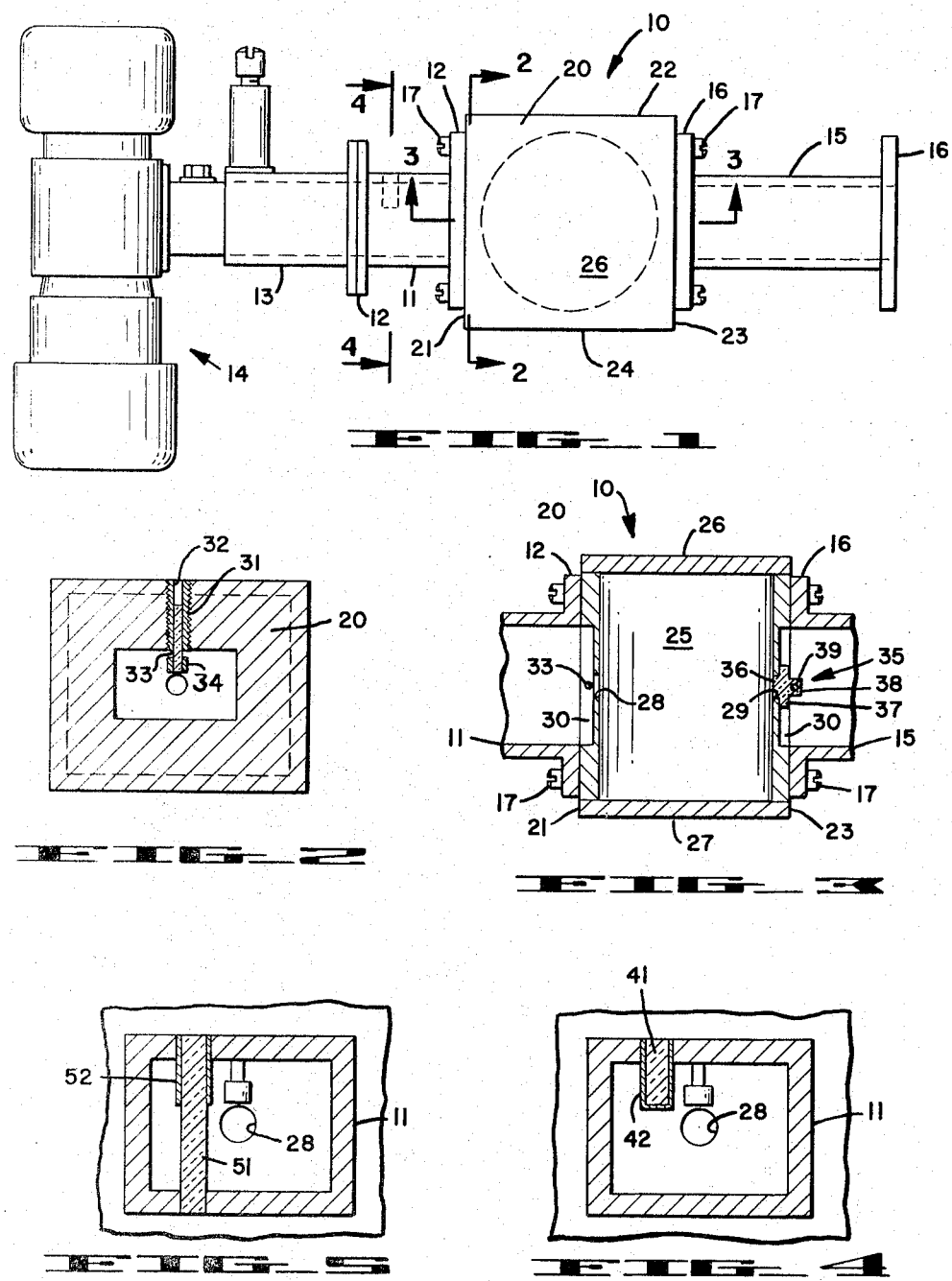
INVENTOR.
VINCENT J. GRANDE
BY
Townsend and Townsend
ATTORNEYS

United States Patent Office 3,308,402
Patented Mar. 7, 1967

3,308,402
CAVITY RESONATOR APPARATUS
Vincent J. Grande, Palo Alto, Calif., assignor, by mesne assignments, to Teledyne, Inc., Hawthorne, Calif., a corporation of Delaware
Filed Dec. 30, 1964, Ser. No. 422,265
3 Claims. (Cl. 333—83)

The present invention relates to ultrahigh frequency apparatus and more particularly to cavity resonators which are easily manufactured and exhibit high stability for use, for example, as filters or as stalos in stabilizing the frequency of a local oscillator such as a reflex klystron.

Cavity resonators have been fabricated in the past by closing the ends of a hollow cylindrical tubular member and providing a coupling aperture or apertures in the side of the cylindrical member for coupling electromagnetic energy into and out of the cavity resonator for coupling the energy to or from the resonator. This construction was costly and time consuming.

Another shortcoming of prior stalos has been their tuning members for adjusting the coupling into and out of the resonant cavity. Typically, these coupling adjustments are tuning screws which are screw threaded in the waveguide and extend into the waveguide in the region of the coupling iris. Inasmuch as these coupling screws were not fixedly secured to the waveguide certain vibration takes place between the screw and the waveguide when the stalo is subjected to vibrational environments such as, for example, in airborne electrical systems, and the vibration of the tuning screw often changes the electrical path from the waveguide to the tuning screw and therefore changes the tuning characteristics and coupling parameter. Even more important is the achievement of smooth tuning at high frequencies such as in excess of 20 Gc. At such frequencies changes in the contact between the screw threads and the waveguide wall in which the screw is mounted can seriously effect the tuning characteristics and coupling parameter.

In accordance with the present invention cavity resonators are formed by boring out the center of a main body member having a substantially square cross section and then closing the ends of the bore to form the resonant cavity. The coupling apertures for the cavity resonator are provided through the side walls of the cylindrical bore to the flat side walls of the main body member on which the associated waveguide members are easily mounted such as, for example, by screws.

This construction provides a solid main body to the cavity resonator which is not easily deformed and onto the sides of which the associated energy transmitting waveguides can easily be attached.

In accordance with another aspect of the present invention the coupling or tuning rods or members for the cavity resonator are made up of dielectric rods which extend through the body member or waveguide walls and which are coated on a portion of the surface contained within the waveguide with a conductive material. Where the tuning member is utilized as a coupling adjustment for adjusting the coupling through the resonator coupling iris, the coating of conducting material is a low resistance metallic coating such as, for example, silver, the position of which can be varied by movement of the rod for varying the coupling from the cavity resonator to the waveguide through the coupling iris. With no contact between the coating and the waveguide where the rod passes through the waveguide no undesirable effects are produced due to non-uniform contact between the rod and the waveguide wall.

Where the dielectric rod is used for varying the conductance of the waveguide the conducting material can be a highly resistive material such as, for example, pyrolytic graphite which is absorptive of electromagnetic wave energy. This dielectric rod coated with such a material and positioned in the waveguide in a region of high electric field for undesired electromagnetic wave modes within the waveguide will absorb electromagnetic wave energy in such an undesired mode to suppress the mode. Such a variable conductance rod can be inserted into the waveguide to the desired distance during operational test of the waveguide.

In accordance with still another aspect of the present invention the coupling between the resonant cavity and the electromagnetic wave energy transmitting waveguide can be adjusted by means of a dielectric plug having an electrically conductive rod embedded therein and rotatably positioned in the coupling iris between the resonant cavity and the waveguide. The orientation of the rod in the plug is such that upon rotation of the plug in the coupling opening the position of the conductive member is changed thereby changing the electromagnetic wave coupling between the cavity and the waveguide. This construction provides an adjustable coupling and at the same time a closure for the cavity resonator. This closure prevents entrance into the cavity of moisture which would have a deleterious effect on the electrical conducting surfaces of the resonant cavity.

These and other objects, features and advantages will be more apparent after referring to the following specification and accompanying drawings in which:

FIGURE 1 is a side elevational view of a cavity resonator in accordance with the present invention mounted on a klystron oscillator for stabilization purposes;

FIGURE 2 is a cross sectional view of a portion of the structure shown in FIGURE 1 taken along the line 2—2 in the direction of the arrows;

FIGURE 3 is a cross sectional view of a portion of the structure shown in FIGURE 1 taken along the line 3—3 in the directions of the arrows;

FIGURE 4 is a cross sectional view of a portion of the structure shown in FIGURE 1 taken along the line 4—4 in the direction of the arrows; and FIGURE 5 is a view similar to FIGURE 4 of an alternative embodiment of the present invention.

Referring now to the drawing with particular reference to FIGURE 1 there is shown a cavity resonator 10 of the transmissive type having an associated input waveguide 11 with flanges 12 for coupling to the cavity 10 and to the output waveguide 13 of a local oscillator shown as a reflex klystron 14. An output waveguide 15 with flanges 16 is provided for connecting the cavity 10 to a load (not shown). While the cavity resonator 10 will be described as a transmissive type having separate input and output waveguides 11 and 15, the present invention applies equally well to reference type cavities having only one waveguide which serves both as the input and the output.

The cavity resonator 10 is formed from a main body member 20 of, for example, Invar having a substantially square cross section and flat side walls 21, 22, 23 and 24. The main body member 20 is provided with a cylindrical bore 25 extending longitudinally thereof with the axis of the bore parallel to the flat sides and normal to the square cross section of the main body member 20. The ends of the bore 25 are closed by end or disc members 26 and 27 such as, for example, of Invar and shown by way of example as fixed in place such as by brazing. This body construction provides a cavity which can be simply and easily constructed and therefore a low cost item. Naturally, one of these end members can be mounted for movement axially of the bore for tuning the cavity resonator.

Input and output coupling holes or irises 28 and 29 are provided in the main body member 20 extending from sides 21 and 23 respectively into the bore 25 thereby to provide communication between the resonant cavity within the main body member 20 and the input and output waveguides 11 and 15, respectively. Each of the input and output sides 21 and 23 of the body member 25 is provided with a recess 30 for permitting location of a coupling screw or rod at the coupling irises 28 and 29 respectively.

The input and output faces 21 and 23 are provided with tapped holes to receiving screws 17 for securing the waveguide members to the side walls of the cavity resonator. With this construction the cavity resonator can be easily manufactured, and commercially available standard waveguides of, for example, Invar secured thereto surrounding the input and output coupling apertures 28 and 29. This construction is especially advantageous with a cavity resonator assembly made entirely of Invar for best temperature stability since Invar is difficult to braze. Additionally, this cavity assembly instead of being manufactured and sold with an output waveguide can be screwed directly to the waveguide flange at the input end of the system.

As shown in FIGURES 1 and 2 an iris coupling assembly is provided which avoids direct metal to metal contact between the cavity or waveguide wall and the conducting material on the coupling rod. The embodiment of the coupling rod assembly illustrated includes a hollow screw 31 either of metal or dielectric material such as Teflon and having a hollow bore 32 therein. Fixedly secured in this hollow bore 32 is a dielectric rod 33 such as, for example, of ceramic, the exterior of which is coated with an electrical conductive material 34 such as, for example, silver which is electrically insulated from the waveguide wall by the rod 33. Movement of the screw 31 provides relative movement between the conductive coating 34 and the coupling iris 28 to vary the conductance between the resonant cavity and the input waveguide 11. Naturally, means other than screw threads can be utilized for providing relative movement between the coupling rod and the iris opening. It has been found that such a coupling assembly has over twice the coupling capabilities of the conventional metallic iris coupling screw. Such an adjustment screw provides smooth variation in coupling characteristics even at high frequencies such as above 20 Gc and is not subject to undesired effects in vibrational environments.

While the conductive coating 34 is preferred on the rod 33, it is possible to vary the conductance with a plain dielectric conducting member. However, in such case a thicker rod and greater travel would be required to achieve the same variation in conductance as achieved with the coated rod. Also, the screw 31 and rod 33 can be made of one piece such as made entirely of a dielectric material such as Teflon. The dielectric portion of the tuning screw is of a diameter beyond cutoff for the operating mode of the waveguide so that no electro-magnetic energy is coupled out of the waveguide through the screw aperture. The coupling screw can either be provided at the input iris 28 or the output iris 29 or take the form of the rotatable plug coupling member illustrated in place in the output iris 29.

As illustrated in FIGURE 3 the plug coupling member includes a plug 35 of dielectric material such as, for example, Teflon provided with an inner cylindrical portion 36 which is rotatably positioned in the output coupling opening 29 and a radially extending flange 37 for preventing the plug from being pushed into the resonant cavity. An elevated ridge 38 is provided on the exterior surface of the plug 35 to permit rotation of the plug. The alignment of the conductive rod 39 is across the output coupling opening 29 so that rotation of the plug 35 such as by turning the orientation of the ridge 38 changes the position of the rod thereby to vary the coupling characteristics between the resonant cavity and the output waveguide.

This coupling assembly not only provides a variable conductance but also hermetically seals the cavity against deleterious atmospheric conditions. While the plug 35 can be of a number of different dielectric materials Teflon is preferred because of its lubricating characteristics which permit ease in rotation. Also, while the plug assembly can be adjusted from the waveguide, means such as, for example, a screw can be provided passing through the cavity body or the waveguide wall for rotating the plug exteriorly of the waveguide.

Referring now to FIGURE 4 located in the input waveguide 11 is a conductance rod 41 utilized for suppression of undesired modes. The rod is formed of a dielectric material such as, for example, ceramic coated with a highly resistive conductive material 42 such as, for example, pyrolytic graphite and is located in a region of high electric field within the waveguide. The adjustable conductance can be supported in the aperture of the waveguide with a friction fit or may be sealed therein. A typical operation for the placement of the rod 41 is to place the rod in the waveguide with the cavity resonator connected to an operating klystron 14 and then to vary the amount which the rod projects into the waveguide. When the desired amount of rod is found to exist inside the waveguide the excess length of the rod outside the waveguide can be removed. With the resistive material located in a region of high electric field for an undesired mode, the undesired mode is effectively suppressed.

For a more rigid support of the adjustable conductance rod, its construction can be that as shown in FIGURE 5 wherein the rod is of sufficient length to project through both of a pair of opposing waveguide walls. The rod 51 is provided on a portion thereof with a highly resistive coating 52 which can be adjustably positioned inside the guide during operation of the resonant cavity by longitudinal movement of the rod 51 projecting outside the waveguide. After the desired location for the coating 52 is obtained the projecting ends of the rod 51 can be removed.

Although the foregoing invention has been described in some detail by way of illustration and example for purposes of clarity of understanding, it is understood that certain changes and modifications may be practiced within the spirit of the invention as limited only by the scope of the appended claims.

I claim:

1. A high frequency cavity resonator comprising: a main body member defining a substantially cylindrical bore therein, means for closing the ends of said bore to define a resonant cavity within said main body member, means defining a coupling opening through said body into said bore for coupling electromagnetic energy into or from said body, waveguide means secured to said main body for conducting electromagnetic wave energy to or from said resonant cavity through said coupling opening, a plug of dielectric material rotatably positioned within said coupling opening, and an elongate electrically conductive member embedded within said plug, the orientation of said conductive member within said plug being such that upon rotation of said plug in said coupling opening the position of said conductive member is changed thereby to change the electromagnetic wave coupling between the resonant cavity and said waveguide.

2. A high frequency cavity resonator apparatus comprising: a main body member having a substantially square cross section taken across at least one of the major axes thereof and having substantially flat sides containing the edges of the square cross section, said main body member defining a substantially cylindrical bore aligned with the axis thereof substantially parallel to said sides and substantially normal to the square cross section, means for closing the ends of said bore to define a resonant cavity within said main body member, means defining a coupling opening through said body from one of said sides into said bore for coupling electromagnetic energy into or from said resonant cavity, means for securing a waveguide member to said one of said sides and surrounding said coupling opening for conducting electromagnetic waves to or from said resonant within said coupling opening, an elongate electrically cavity, a plug of dielectric material rotatably positioned within said coupling opening, an elongate electrically conductive member embedded within said plug, the orientation of said conductive member within said plug being such that upon rotation of said plug in said coupling opening the position of said conductive member is changed thereby to change the electromagnetic wave coupling between the resonant cavity and said waveguide member, a first rod of dielectric material extending through said waveguide member adjacent said coupling opening, a coating of electrically conductive material on a portion of said rod out of contact with said waveguide member, means for providing relative movement between said dielectric rod and said waveguide member for changing the relative position of the coated portion of said rod and said coupling opening thereby to vary coupling of electromagnetic wave energy between said resonant cavity and said waveguide member, a second rod of dielectric material extending through said waveguide member into a region of high electric field for an undesired electromagnetic wave mode and a coating of electrically resistive material on said rod for suppression of electromagnetic wave energy in such undesired mode.

3. A high frequency cavity resonator apparatus comprising: a main body member having a substantially square cross section taken across at least one of the major axes thereof and having substantially flat sides containing the edges of the square cross section, said main body member defining a substantially cylindrical bore aligned with the axis thereof substantially parallel to said sides and substantially normal to the square cross section, means for closing the ends of said bore to define a resonant cavity within said main body member, means defining a coupling opening through said body from one of said sides into said bore for coupling electromagnetic energy into or from said resonant cavity, waveguide means associated with said main body member for conducting electromagnetic waves to or from said resonant cavity, means for securing said waveguide means to said sides of said main body member, a plug of dielectric material rotatably positioned within said coupling opening, an elongate electrically conductive member embedded within said plug, the orientation of said conductive member within said plug being such that upon rotation of said plug in said coupling opening the position of said conductive member is changed thereby to change the electromagnetic wave coupling between the resonant cavity and said waveguide means, a rod of dielectric material extending through said waveguide means into a region of high electric field for an undesired electromagnetic wave mode and a coating of electrically resistive material on said rod for suppression of electromagnetic wave energy in such undesired mode.

References Cited by the Examiner

UNITED STATES PATENTS

| 2,197,122 | 6/1937 | Bowen | 333—98 |
| 2,381,367 | 8/1945 | Quayle | 333—95 |
| 2,503,256 | 4/1950 | Ginzton et al. | 333—83 |
| 2,565,112 | 8/1951 | Altar et al. | 333—83 |
| 2,605,459 | 7/1952 | Cook | 333—83 |
| 2,644,889 | 7/1953 | Finke et al. | 333—83 |
| 2,701,343 | 2/1955 | Lange | 333—83 |
| 2,944,232 | 7/1960 | Beljers | 333—83 |
| 3,013,230 | 12/1961 | Simkovich | 333—83 |

FOREIGN PATENTS

| 747,028 | 3/1956 | Great Britain. |
| 1,025,473 | 3/1956 | Germany. |
| 982,836 | 2/1965 | Great Britain. |
| 307,494 | 8/1955 | Switzerland. |

HERMAN KARL SAALBACH, *Primary Examiner.*

E. LIEBERMAN, L. ALLAHUT, *Assistant Examiners.*